No. 619,933. Patented Feb. 21, 1899.
J. BUCHEL & F. McGLOIN.
AUTOMATIC CAR BRAKE.
(Application filed Dec. 27, 1897.)
(No Model.)
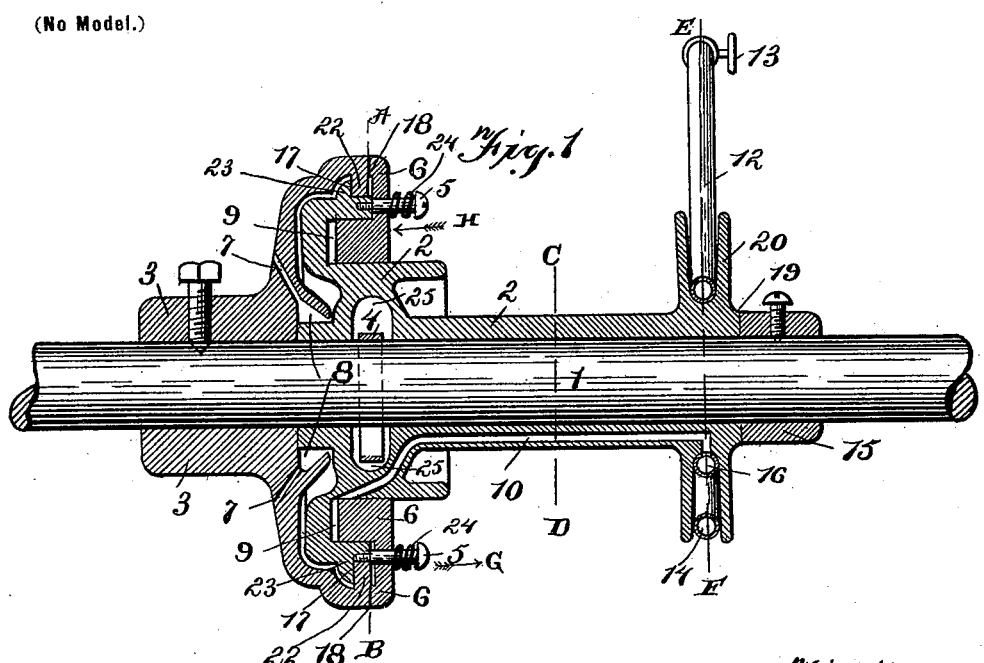
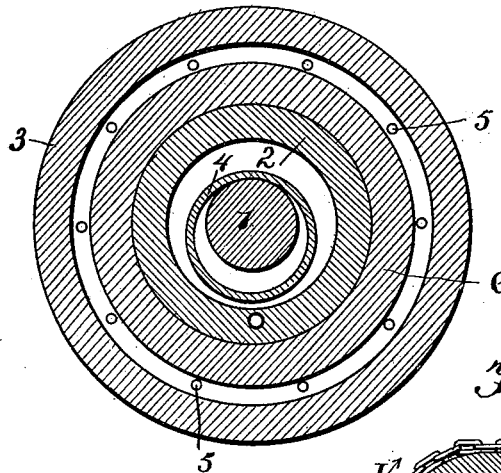
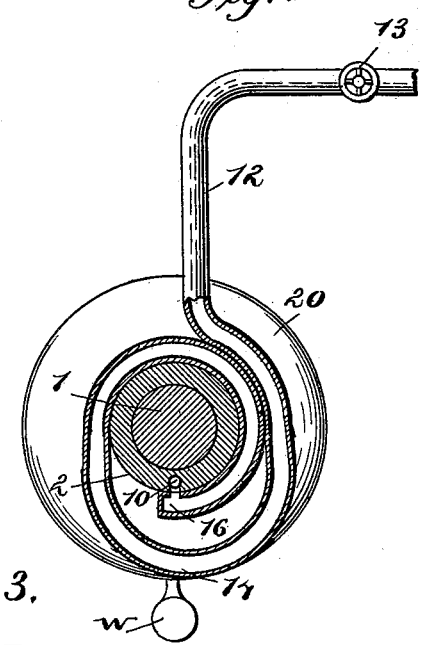
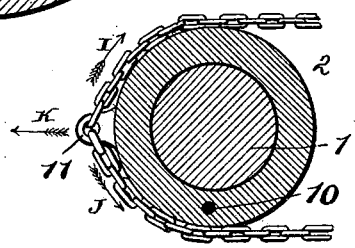
Witnesses
Geo. E. Fuch.
A. F. Bates.
Inventors
Jules Buchel
Frank McGloin
per M. L. Moran,
Attorney

UNITED STATES PATENT OFFICE.

JULES BUCHEL AND FRANK McGLOIN, OF NEW ORLEANS, LOUISIANA.

AUTOMATIC CAR-BRAKE.

SPECIFICATION forming part of Letters Patent No. 619,933, dated February 21, 1899.

Application filed December 27, 1897. Serial No. 663,763. (No model.)

*To all whom it may concern:*

Be it known that we, JULES BUCHEL and FRANK McGLOIN, citizens of the United States of America, residing at New Orleans, in the parish of Orleans and State of Louisiana, have invented certain new and useful Improvements in Automatic Car-Brakes, of which the following is a specification, reference being had therein to the accompanying drawings.

This invention relates to that class of car-brakes in which the brake-levers are operated by a friction clutch device which is normally held loose or inactive by air-pressure, but which is adapted to tighten by constant spring-pressure when the air-pressure in the train-pipe is reduced.

The invention consists in a certain construction and arrangement of parts hereinafter described and claimed.

In the drawings, Figure 1 is a longitudinal sectional view of the device mounted upon the axle of a car. Fig. 2 is a transverse section taken in the line A B of Fig. 1. Fig. 3 is a transverse section taken on the line C D of Fig. 1, and Fig. 4 is a transverse section taken on the line E F of Fig. 1.

The numeral 1 represents the axle of the car, upon which the device is mounted.

3 denotes the friction-disk, provided with extended and curved flanges, as shown. This friction-disk and the collar 15 are fastened to the axle and revolve therewith. Between the disk and the collar is mounted the drum 2, which is provided with an extension corresponding to the flanges of the revolving disk, but does not normally revolve therewith. The revolving disk has an inwardly-projecting flange 22, which engages the circular outwardly-projecting flange 23, forming a frictional contact 17. In the extension of the drum is provided an annular chamber or cylinder 9, fitted with piston 6. This piston has a radially-extending flange adapted to bear at its outer edge against the flange 22 of the revolving friction-disk 3, forming a frictional contact-surface at 18. Secured in the flange 23 of the drum and projecting through openings in the flange of piston 6 are a series of bolts 5. On each bolt, between its head and the piston, is a coiled spring 24.

The brake-lever chains are adapted to be wound on the drum 2, which is provided with an ear 11, to which they are fastened. The cylinder communicates by a passage 10 in the drum with the air hose-pipe.

As will be observed, the whole system is mounted upon the axle of the car-wheel, the air-pressure for operating same being supplied by means of a hose 12, the air first passing through valve 13, then reaching the end of hose wound around drum 2, and finally escaping into the channel 10 through opening 16. (See Figs. 1 and 4.) The point 14 shows the sag of the hose as it is partially unwound when the eye 11 is in the position as indicated by arrow K. (See Fig. 3.) The brake-lever chain winds around drum 2, which is situated on shaft or axle 1 and is so arranged that when the axle turns either in direction of arrow I or J the chain will be wound around 2 and the levers drawn up with a force that is proportional to the coefficient of friction that exists between the surfaces 17 and 18. This coefficient is determined by the springs that go around bolts 5. These springs tend to pull the bolts out in the direction of arrows G and G, while they push the air-piston 6 in the direction of the arrows H and H. The air-pressure entering the channel 10 through the opening 16 goes along on the interior of drum 2 until it reaches the back of the piston 6, as indicated by the arrows 19 and 19. Now this air-pressure resists the tendency of the springs to bring the surface 17 and 18 into solid frictional contact, and thus the presence of this pressure is made to keep the brakes off, and it is further arranged that a reduction of twenty pounds in the channel 10 and pipe 14 is quite sufficient to give all the brake action that is required within sliding limits of the wheels, with the additional advantage that the wheels can be slid in an emergency, if required, by further releasing the pressure.

The flange 22 of the friction-disk 3 comes between the flanges of the drum 2 and piston 6, and when these are brought together this disk is clamped at the points 17 and 18, with the result that the drum 2 is carried along and winding in either direction sets the brake-shoes to a certain strain, after which the disk 3 begins to rotate between the surfaces 17 and 18 and no increased brake action follows beyond what the springs are set for. This friction-disk 3 contains holes leading into the counterbore 8 to permit any oil that may be carried out of the bearing to find egress before reaching the frictional surfaces at 17 and 18.

4 is a lubricating-ring that carries the oil from bottom of the chamber 25, in which it rolls, up to the top of shaft 1, this oil then spreading into the bearing on which the drum 2 is supported and which is the car-wheel axle.

It will be noticed that when the brakes are off, the springs in clamping the surfaces 17 and 18 do so without any end strain, the clamping strains being balanced so far as the rest of the apparatus is concerned. This has a further advantage in this that a certain pressure upon the surface 17 is likewise duplicated upon the surface 18, which makes the coefficient of friction twice as great as it would otherwise be for a given weight.

A counterbalance-weight W is put at about the point 14 on the flange 20 to have the effect of keeping the drum 2 in such a position that the eye 11 would be held in the direction as indicated by arrow K. The amount of weight required to do this will depend on the coefficient of friction between the axle 1 and the drum 2, which would probably not exceed ten pounds. In order to get the requisite pressure on the compression-springs that are to go between the head of bolt 5 and the face of piston 6, so as to give full brake action and yet not too much, we propose to use a dynamometer-wrench for screwing up these bolts until the dynamometer indicates a certain resistance, which resistance has been determined experimentally beforehand as giving a certain net pressure upon the face of piston 6. Then all the inspectors have to do is to go over their brakes periodically and turn up their bolts until the dynamometer indicates the proper degree of resistance, when they can rest assured that the springs are exerting the proper pressure to give the requisite brake action and without any danger of getting an excess of pressure to slide the wheels.

The mode of operation is as follows: The engineer turns his pressure on the train-pipe as usual. Our hose 12 is a branch from this train-pipe. The pressure equalizes itself through the opening 16 into the channel 10, reaching the cylinder 9 back of our piston 6, and forces the latter out in a contrary direction to the arrow H against the resistance of the springs situated under the heads of bolts 5 and 5. The air also forces the drum 2 by reacting against the back of piston 6 in the direction contrary to arrows G and G. This operation causes the drum 2 and piston 6 to release their vise-like grip on the periphery of the disk 3 at the points 17 and 18, with the result that disk 3 is permitted to rotate freely.

An excess of pressure in the train-pipe over and above what is just necessary to release the surface 17 and 18 of the disk 3 has no detrimental effect whatever, since it merely compresses the springs under 5 and 5 and increases the space at point 9 behind the air-piston 6. A stop S, however, limits the further compression of the springs under 5, so that the space at point 9 will not increase any more than is allowable.

In releasing the brakes all that is necessary is to restore the air-pressure in train-pipe, and to give a full application the pressure is reduced to, say, fifty pounds from seventy, and with such a reduction of twenty pounds we have enough area on the back of our piston 6 to permit heavy enough springs being used that with the reduced resistance due to twenty pounds to the square inch we have sufficient clamping pressure between surfaces 17 and 18 to effect all the objects of full brake application. Any greater reduction than twenty pounds would put on the emergency and finally slide the wheels.

In order to prevent brakes from going too fast, we have a throttling-valve 13 in the train-pipe branch 12, which prevents the air confined behind piston 6 and in the channel 10 from rushing out too fast, and also prevents a too sudden release for the same reasons. When the release is effected, the chain wound around drum 2 unwinds rapidly on account of the elasticity of the brake-levers acting like a spring and the point K is reached, at which point the drum is held by means of a weight on the flange of drum at the point 14 and on the flange 20.

In the event of cars being separated for the purpose of switching or side-tracking while separated from the supply of air it is necessary that valve 13 be closed before separating the car from balance of the train, so as to prevent the escape of air and setting of the brake. In such cases the brake is operated by means of the regular hand-brakes, as is now done with reference to the ordinary air-brakes.

What we claim is—

1. In a car-brake apparatus, a winding-drum with brake-chains, a friction-clutch for winding the drum a pressure-cylinder mounted on the drum and connected to the train-pipe, a piston provided with a circular friction-flange forming a part of the clutch, and springs acting upon the piston against the air-pressure in the cylinder whereby the clutch tightens upon a reduction of the train-pipe pressure.

2. In a car-brake apparatus a winding-drum with brake-chains, a friction-clutch for winding the drum, springs for actuating the clutch, an annular cylinder formed upon the drum provided with connections to the train-pipe, and a piston acting upon the clutch against the spring-pressure for loosening the clutch.

3. In a car-brake apparatus, a winding-drum with brake-chains mounted upon an axle, a disk fastened to and revolving with the axle having an extended flange forming a frictional contact-surface, the said drum being also provided with a contiguous friction-flange, springs for forcing the flanges into frictional contact, an annular cylinder on the drum connected with the train-pipe pressure and an annular piston in the cylinder acting against the force of the springs.

4. In a car-brake apparatus a winding-drum with brake-chains mounted upon an axle a disk fastened to the axle and having a friction-flange, a cylinder mounted on the drum and connected to the train-pipe pressure, a piston for the cylinder having a flange adapted for frictional contact with the flange of the disk and springs acting to force the flanges together against the pressure in the cylinder.

5. In a car-brake apparatus, a winding-drum with brake-chains mounted upon an axle, a disk fastened to the axle close to the drum, both the drum and disk being provided with frictional contact-surfaces, a cylinder on the drum connected to the train-pipe pressure, a piston for the cylinder also having a frictional contact-surface and springs acting to force the contact-surfaces together against the air-pressure upon the piston.

6. In a car-brake apparatus, a winding-drum with brake-chains and a pressure-cylinder mounted on an axle, a disk rigidly fastened on the axle close to the drum, both the drum and disk being provided with contiguous frictional contact-surfaces, springs acting to bring the surfaces together, a piston for the cylinder adapted to compress the springs, flexible pipe connecting the pressure-cylinder with the train-pipe, and flanges arranged on the drum between which the flexible pipe may be wound.

7. In a car-brake apparatus, a winding-drum with brake-chains mounted on an axle, an annular chamber in the drum, a feeding-ring on the axle in the chamber, a friction-disk fastened on the axle close to the drum, said disk having a counterbore provided with outlet-holes adapted to receive the oil from the drum-bearing and prevent it from reaching the frictional contact-surfaces substantially as described.

In testimony whereof we affix our signatures in presence of two witnesses.

JULES BUCHEL.
FRANK McGLOIN.

Witnesses:
EMILE F. BUCHEL,
JOHN R. JOHNSON.